Jan. 6, 1970          A. DUBOIS                    3,488,548
       COPPER SUPPORTED CERAMIC ELECTRODES FOR
              MAGNETOHYDRODYNAMIC GENERATORS
                    Filed July 27, 1967

United States Patent Office 3,488,548
Patented Jan. 6, 1970

3,488,548
COPPER SUPPORTED CERAMIC ELECTRODES FOR MAGNETOHYDRODYNAMIC GENERATORS
Andre Dubois, Orsay, France, assignor to Commissariat a l'Energie and Electricite de France, Paris, France
Filed July 27, 1967, Ser. No. 656,566
Claims priority, application France, Aug. 16, 1966, 73,196
Int. Cl. H01j 1/14, 19/06
U.S. Cl. 313—346                            6 Claims

ABSTRACT OF THE DISCLOSURE

Electrodes of ceramic materials in magnetohydrodynamic generators have a support for each electrode consisting of a block of copper with a recessed surface. This recess contains a member for electrical connections and is surmounted by a plate of ceramic material enriched with emissive material, brazed on to the member and flush with the surface of the support.

---

The invention relates to electrodes of ceramic materials as used in magnetohydrodynamic generators and in particular to electrodes of this type which use ceramic materials enriched with emissive materials.

Ceramic materials, for example zirconium dioxide and its derivatives, are known to be generally so sensitive to rapid temperature variations that they may break. Electrodes for magnetohydrodynamic generators are subject to temperature variations of the order of 1700° C. at least between the surface in contact with the gases and the surface which is cooled. This variation further increases the fragility of the ceramics used.

Also, ceramic materials are known to be substantially more electrically conductive when their temperature is above 1000° C. than when they are at the ambient temperature. The electric current must therefore be drawn from a zone in which the temperature is of the order of 800 to 900° C. or more.

The main object of the invention is to make electrodes of this type such that they fulfil the various requirements of practice better than before, more particularly by improving their resistance to thermal shock and their behaviour in connection with erosion from the fast-moving gases.

The invention consists mainly in that the support for each electrode consists of a block of copper with a recessed surface, and this recess contains a member used for electrical connections and surmounted by a plate of ceramic material suitably enriched with emissive material, brazed on to the member and flush with the surface of the support.

In the preferred embodiment of the invention the member used for the electrical connections is constituted by bars of ceramic material submerged in a metal layer, more particularly a silver or nickel layer. Preferably the periphery of the recess in the copper support is chamfered, while the plate of ceramic material may be brazed on to the unit comprising the bars and the metal layer.

In another embodiment of the invention the member used for the electrical connections is made of a metal material with poor thermal conductivity and a suitable expansion coefficient, and the plate of ceramic material is fixed to it by a brazed joint, more particularly of pure silver. The ceramic material may be lime-rich zirconium dioxide, while the metal material with poor thermal conductivity is Monel, nickel, titanium or Dilver P.

The invention will be better understood from the following description and the accompanying drawings, given by way of example only.

Figure 1:
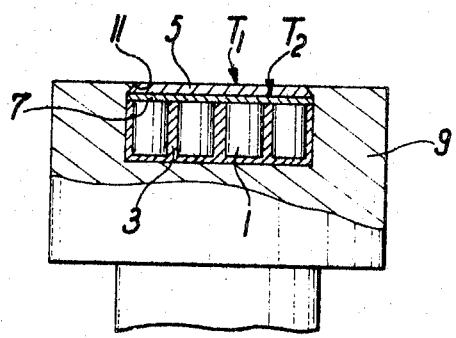
Figure 2:
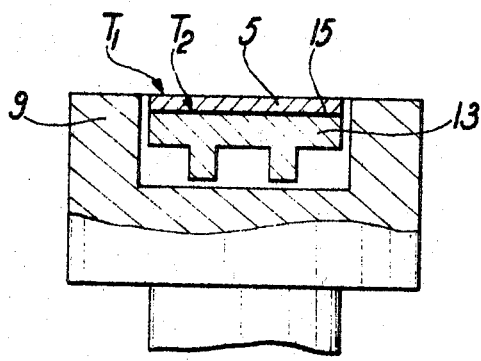

In the accompanying drawings:
FIG. 1 is a partial section through a first embodiment of an improved electrode; and
FIG. 2 is a partial section through a second embodiment of an improved electrode.

FIG. 1 shows an electrode in which the member used for electrical connections is made of bars 1 of ceramic material. These bars have dimensions of a few millimetres, for example 2–4 mm., and their height is selected in accordance with the thermal flux reaching the electrode and the thickness of a metal layer 3 in which these bars are submerged. This layer 3 may be of silver or nickel.

A condition of the device embodying the invention is that the temperature $T_2$ at the top of the bars must be in the region of 900° C. A ceramic plate 5 is fixed on the metal layer 3 and bars 1, by means of a deposit 7 whose thickness is not critical. The electrode has a copper support 9 with a chamfer 11, which is intended to keep the plate 5 under compression when the electrode is subjected to heat.

The metal layers 3 make the material resistant to thermal shock.

The division into bars 1 with small dimensions permits the latter, when the temperature changes, to be the site of compressive and tensile stresses below their breaking point.

The presence of the plate 5, whose thickness must be selected according to the thermal flux, ensures that the temperature $T_1$ at the electrode surface is between 1700° C. and 1900° C., as required for good emission, and in particular it ensures that this temperature $T_1$ is sufficiently uniform.

The resistance to erosion is increased because the structure permits careful machining. In fact, the upper surface of the plate 5 may be ground with a diamond tool if desired.

The brazing 7 also increases the mechanical resistance, since stressing of the plate 5 is therefore uniform.

FIG. 2 shows an alternative embodiment of electrode, again with a copper support 9 and a plate 5 of ceramic material. However, in this embodiment less of the emissive ceramic material is used, since the thickness of the plate 5 is adjusted according to the thermal flux and its thermal conductivity, so that the temperature $T_1$ is between 1700 and 1900° C. and the temperature $T_2$ is between 800 and 900° C. The member used for electrical connections is a simple metal support 13 on to which the plate 5 is fixed by a brazing 15, for example of pure silver or Nioro. The metal support 13 may be of Monel, nickel, titanium or Dilver P., since these materials have expansion coefficients very similar to those of the ceramics based on lime-rich zirconium dioxide ($11.10^{-6}$ per degree) which can be used for the plate 5. Also, these materials are fairly bad conductors of heat. The metal support 13 may be machined, more particularly as shown in FIG. 2, so that its dimensions are small and its two ends are respectively at 900 and 1000° C.

I claim:
1. Electrodes of ceramic materials for magnetohydrodynamic generators comprising a support for each electrode of a block of copper, a recess in a surface of said block, a member in said recess for electrical connections and a plate of ceramic material enriched with emissive material brazed on said member and flush with the surface of said support.

2. Electrodes as claimed in claim 1, said member being bars of ceramic material in a metal layer of silver or nickel.

3. Electrodes as claimed in claim 1 the periphery of said recess in said copper support being chamfered.

4. Electrodes as claimed in claim 1, said member being a metal material with poor thermal conductivity and a suitable expansion coefficient, and said plate being fixed to said member by a brazed joint of pure silver.

5. Electrodes as claimed in claim 4, said metal material with poor thermal conductivity being selected from the group consisting of Monel, nickel, titanium, Dilver P.

6. Electrodes as claimed in claim 1, the ceramic material being lime-rich zirconium dioxide.

References Cited

UNITED STATES PATENTS

| | | | |
|---|---|---|---|
| 3,274,408 | 9/1966 | Louis | 313—346 X |
| 3,397,331 | 8/1968 | Burkhard | 313—311 X |
| 3,401,278 | 9/1968 | Shih-Ming Ho | 313—346 X |
| 3,406,300 | 10/1968 | Teno et al. | 313—346 |

JOHN W. HUCKERT, Primary Examiner

A. J. JAMES, Assistant Examiner

U.S. Cl. X.R.

310—11; 313—311